United States Patent [19]

Sherer et al.

[11] Patent Number: 4,831,720

[45] Date of Patent: May 23, 1989

[54] HEAT EXCHANGE TUBE INSERTION TOOL

[76] Inventors: C. Richard Sherer, 15720 Charolais Dr., Cypress, Tex. 77429; T. Lester Jones, 3487 Campbell Rd., Houston, Tex. 77080

[21] Appl. No.: 189,478

[22] Filed: May 2, 1988

[51] Int. Cl.⁴ .......................................... B23P 15/26
[52] U.S. Cl. .................. 29/726; 29/157.3 C; 29/157.4; 29/407.08
[58] Field of Search ............... 29/726, 157.3 C, 157.4, 29/402.08, 423, 426.1, 464, 468, 33 T, 234, 235, 272, 282, 157.3 R

[56] References Cited

U.S. PATENT DOCUMENTS

| 3,125,800 | 3/1964 | Klimer | 29/726 |
| 4,106,177 | 8/1978 | Beard et al. | 29/726 |
| 4,427,031 | 1/1984 | DiGiovanni et al. | 29/234 |
| 4,547,963 | 10/1985 | Ohmstede | 29/726 |
| 4,643,247 | 2/1987 | Tomasula | 29/726 |
| 4,734,969 | 4/1988 | Aurier et al. | 29/726 |
| 4,771,526 | 9/1988 | Arzenti et al. | 29/726 |

FOREIGN PATENT DOCUMENTS

| 0168698 | 1/1986 | European Pat. Off. | 29/726 |
| 2754415 | 6/1979 | Fed. Rep. of Germany | 29/726 |
| 0880685 | 11/1981 | U.S.S.R. | 29/726 |
| 1134336 | 1/1985 | U.S.S.R. | 29/726 |

Primary Examiner—Howard N. Goldberg
Assistant Examiner—Irene Cuda
Attorney, Agent, or Firm—Richard L. Moseley

[57] ABSTRACT

A system is provided for easily replacing a single tube in shell and tube heat exchangers without removing the bundle. The system comprises: (1) a rod which is inserted into the tube to be replaced and left in place when the tube is removed and (2) a special tool which is adapted to fit into the end of a replacement tube and over the rod.

8 Claims, 1 Drawing Sheet

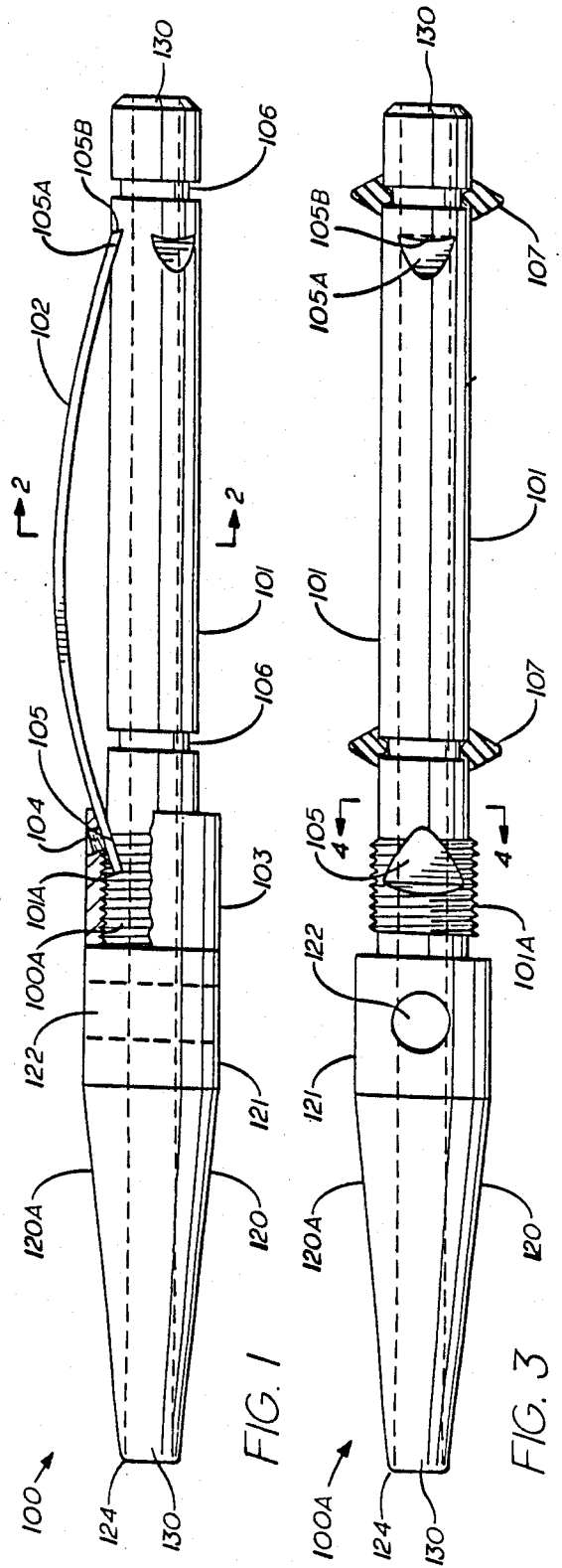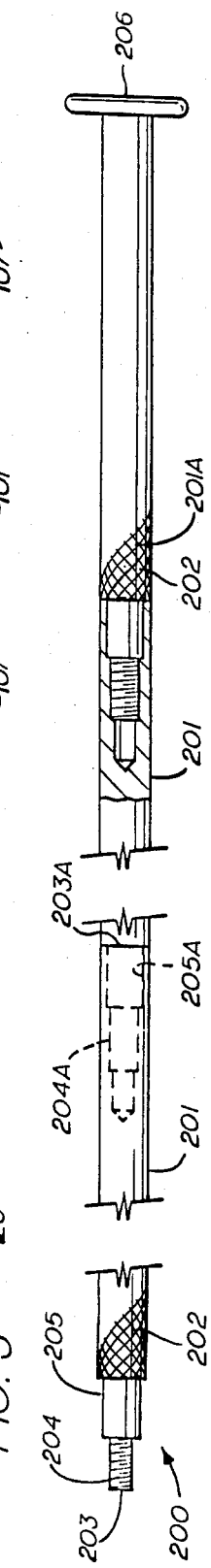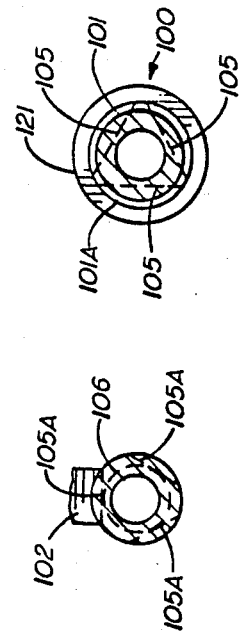

HEAT EXCHANGE TUBE INSERTION TOOL

BACKGROUND OF THE INVENTION

Shell and tube heat exchangers are commonly used in the petrochemical, refining and power industries as effective means of exchanging heat between two flowing streams. The shell and tube heat exchangers generally contain a multitude of tubes contained within a cylindrical shell. The cylindrical shells are generally provided with removable headers at either end through which a first flowing fluid enters and leaves. Near each end of the shell tube sheets are provided to support the tubes, provide a header space and separate the first flowing fluid from the central portion of the shell by forcing the first flowing fluid into the tubes and then out into the opposite header space. The second flowing fluid enters the shell between the tube sheets and flows across the tubes exchanging heat with the first flowing fluid and then out of the shell. Depending upon the length of the shell and tube exchanger, a number of baffles are provided along the length inside the shell to support the tubes. The tube sheets and baffles all have individual holes which are in reasonable alignment lengthwise in the shell to accomodate each tube. Several hundreds or thousands of tubes may be utilized depending upon the diameter of the cylindrical shell. Additionally such heat exchangers may be forty to fifty feet long with commensurately long tubes.

During use, depending upon service, single tubes may become plugged. Some of the tubes may become cracked causing leakage from the shell side to the tube side or vice versa depending upon the pressures in the shell side and tube side. Also, corrosion and other factors may cause individual tubes to lose their physical integrity making the exchanger dangerous. Especially when cracks occur, the leaking tube must be identified and taken out of service. One common method of taking a tube out of service is simply to plug either end of the leaking tube. However, such practice effectively reduces the surface area available for heat transfer between the flowing fluids. When a tube becomes plugged or fouled the same net reduction in surface area results.

It may thus become desirable to replace individual tubes within a tube "bundle". This may be done in two fashions: (1) by removing the headers and pulling the entire tube bundle out of the shell or (2) by removing the headers and pulling the individual tube. The second method would be preferable because heavy equipment such as hoists and cranes are needed for the first. The time involved in the first is also considerable. However, while pulling an individual tube is relatively easy, the alignment of the replacement tube with the holes in the tube sheets and baffles is difficult or impossible, especially with longer exchangers.

The inherent problem in replacing an individual tube is its alignment with its holes in the baffles which themselves may not be in perfect alignment. One method of aligning the replacement tube with its holes is to cut a "window" in the shell and visually align the replacement tube with the holes. However, this is not desirable since cutting the "window" destroys the physical integrity of a "coded" vessel which would require special welding to close the "window" and inspection and testing after the "window" has been closed.

In an attempt to facilitate insertion of the replacement tube one heat exchanger company, The Thomas C. Wilson Co., provides a "tube guide" which may be inserted into the end of the replacement tube to assist in aligning the tube with its holes. The Wilson tube guide has a rounded bullet shaped head which extends from the replacement tube which is supposed to guide the tube into the hole. In other words, it replaces the squared off end of the tube with a solid tapered end. However, due to the tubes sagging between the baffles and the possible misalignment of the holes, alignment is still not easy and in some cases still impossible.

The inventors herein have experimented with using a rod which is inserted the length of the tube to be replaced and left hanging in the baffles after the tube is removed. The replacement tube would be placed over the rod and the rod would guide the tube through the holes in the tube sheets and baffles. While the inventors do not known if such a method has ever been used by others, experimentation has disclosed serious drawbacks. The rod rests on the lower part of the hole and sags between baffles. The blunt end of a tube simply follows the rod to the lower part of the hole and butts against the baffle preventing passage through the hole.

Thus a solution to easily replacing tubes in a shell and tube exchanger was seen to be needed. The advantages of the solution are obvious to those skilled in the art. A simple inexpensive system to quickly replace tubes in a tube bundle would save time and effort and thus money in returning a heat exchanger to service. The present invention provides such an easy and simple expedient for replacing tubes in a heat exchanger with the tube bundle in place. Using the system, tool and method described hereinbelow a sixteen foot tube has been replaced in a matter of seconds.

SUMMARY OF THE INVENTION

A system, tool and method are provided for easily replacing a single tube in a shell and tube heat exchanger without removing the bundle. The system comprises: (1) a rod which is inserted into the tube to be replaced and left in place when the tube is removed and (2) a special tool which is adapted to fit into the end of a replacement tube and over the rod.

The rod is conveniently provided in segments of lengths equal to the standard tube joint length, i.e. eight feet, with one segment of shorter length to insure the rod extends from both ends of the tube (and tube sheets). The shorter segment also includes a handle or other means on the end to prevent the rod from being pulled through the exchanger when the defective tube is removed.

The tool includes a tapered head whose outer diameter at its widest point is essentially equal to the outer diameter of the replacement tube and which has an extension adapted to fit into and be secured and centered within the replacement tube. The extension is provided with deformable centering means along its length in the form of springs, O-rings or the like to center the extension and secure it within the replacement tube with a friction fit. The tool is provided with a central bore which is slightly larger than the rod e.g., 17/64 inch for a 1/4 inch rod, which allows the tool to fit over the rod and slide along the rod with the minimum of wobble.

In use, the rod is inserted into one end of the defective tube with the handle abutting the tube sheet. The tube is then pulled from the opposite end leaving the rod in place through the tube sheets and baffles. The tool is inserted into the end of the replacement tube and both tube and tool are fitted over the rod. The tool guides the replacement tube along the rod while the tapered head guides the tube through the holes in the tube sheets and baffles. The tapered head centers the tube in the holes as the tube and rod slide along the rod. Due to the small clearance between the tool bore and rod, there is minimum wobble allowing smooth passage along the rod and through the holes.

BRIEF DESCRIPTION OF THE DRAWING

FIG. 1 is a side elevational view of one embodiment of the tool of the present invention including spring as the centering and securing means.

FIG. 2 is a view of the tool of FIG. 1 taken along line 2—2.

FIG. 3 is a view of the tool of FIG. 1 rotated 90° about its longitudinal axis and having o-rings as the securing and centering means in lieu of the springs.

FIG. 4 is a view of the tool of FIG. 3 taken along line 4—4

FIG. 5 is a view of the guide rod used in the present invention.

DETAILED DESCRIPTION OF THE PREFERRED EMBODIMENT

For a detailed description of the preferred embodiment of the invention the reader is directed to the accompanying drawings in which like components are given like reference numbers. Since shell and tube heat exchangers are fairly standard throughout the industry, their description and terminology are assumed to be known by those skilled in the art.

Referring first to FIG. 5 there is shown the guide rod which is inserted into the tube to be removed and left in place after the tube is removed. The guide rod is generally depicted at 200 and is shown to include several segments of equal length 201. The length of these segments 201 is conveniently set at eight feet since that is the standard length of a tube joint. Additionally, a shorter segment 201A is included to insure that the rod will extend beyond the tube sheets at either end when in place. The shorter segment includes a handle 206, the diameter of which is sufficiently greater than the tube outer diameter (or hole inner diameter) to hold the end of the rod in place against the outside of the tube sheet. Each segment 201 and 201A has a male end 203 which has external threads 204 and may include a shoulder 205 to add strength and integrity to the male member 203. On the opposite end of the equal length segments 201 is provided a female end 203A which is the exact reverse of the male end. The female end 203A includes a matching space 205A for shoulder 205 and internal threads 204A such that when male ends 203 of one segment is threadedly connected to the female end 203A of another segment there is a smooth single length of rod. Between the ends 203 and 203A the rod as depicted is $\frac{1}{4}$ inch in diameter. Other diameter rods may be used with different diameter tubes. A knurled surface 202 is provided at either end of the rod as shown near the male end 203 for ease of turning the segment during connection.

Referring now to FIGS. 1–4, there is depicted the special insertion tool 100 used in the invention. As depicted the insertion tool has two parts, the body 100A and a nut 103. The body 100A may be machined from a single piece of stock and is shown to have two distinct sections—a bullet like tapered head 120 and an extension 101 extending from the rear of the head 120. While heat exchanger tubes are manufactured in a variety of outer diameters with several inner diameters it will be appreciated by those skilled in the art that most are manufactured in accordance with the Birmingham Wire Gauge (BWG) standard dimensions. The required tool dimensions and clearances can thus be determined readily and the inventors contemplate providing a set of standard tools and rods to accomodate different heater tube dimensions.

Referring again to FIGS. 1–4, extension 101 is adapted to fit into the end of a replacement heater tube and is sized accordingly. The head 120 should at its widest point, as at shoulder 121, should be the same dimension, within machining tolerances, as the outer diameter (OD) of the tube and abut the end of the tube when the extension 101 is fully inserted. If the nut 103 is used, the nut is of the same outer diameter as the shoulder and the rear of the nut abuts the end of the tube.

To secure and center the tool 100 in the replacement tube the extension is provided with deformable engaging means along its length. In FIG. 1 these deformable engaing means are shown to be three longitudinal flat springs 102 (only one shown) evenly spaced about the extension 101. In FIG. 3 these deformable engaging means are indicated to be deformable O-rings 107 which fit into grooves 106 machined into intension 101. Other means might include longitudinal rubber inserts or mechanical spring loaded balls. The only requirements for the deformable securing means are (1) the deformable means in their relaxed state are slightly larger than the inner diameter (ID) of the heater tube and (2) the ability to deform when the extension is inserted into the tube to provide a friction fit and center the extension in the tube.

In the embodiment shown the extension 101 is provided with means to attach the flat longitudinal springs 102 to the extension 101. On the end nearest the head 120 external threads 101A are provided that are engageable with nut 103. At either end (including threads 101A) flat areas 105 and 105A are machined at a slight angle (15°) downward towards the ends of the extension 101. Additionally, at the end opposite the head a slight over hang 105B is left extending over machined area 105A. To install the flat springs 102, the nut 103 is first slipped over the extension 101 and one end of a flat spring is inserted under overhang 105B. The other end of the flat spring is inserted into the nut 103 and against flat area 105 and the nut 103 then threaded onto external threads 101A. The nut is provided with a recessed set screw 104 which is set at a right angle to flat area 105. The set screw 104 may be tightened down to prevent the spring 102 from slipping out from under the nut 103 and to prevent nut 103 from unscrewing.

As noted above, and as shown in FIG. 3, deformable O-rings 107 may be placed in groves 106 in lieu of the springs. This is especially useful for the smallest ID heat exchanger tubes of a given OD. It will be appreciated that several sets of springs 102 or O-rings 107 may be required to accomodate all ID's of a given OD heater exchanger tube.

Now looking at the head there is shown a shoulder 121 which is essentially the same diameter as the replacement tube. The head includes a tapered portion 120A which tapers toward the front of the head. It will be appreciated that due to the standard tube dimensions referenced above that the outer diameter of shoulder 121 is easily ascertainable for a given heater tube.

a bore 130 extends the length of the tool and is adapted to fit closely over the guide rod 200. In the embodiment shown the bore 130 has a diameter of 17/64 inch leaving a clearance of 1/64 inch (or 1/128 inch on either side) for the rod. While different diameter rods may be used for different diameter tubes, e.g., a ½ inch rod for a 1½ inch OD tube, the same basic clearance is prefered. This small clearance assures that there is minimal wobble of the tool 100 on the rod 200 and yet permits the tool 100 to easily glide along the rod 200. Where the bore 130 exits the head 120, the head is slightly rounded 124 to prevent burring when the head 120 contacts the tube sheets or baffles as it passes along the rod 200. Additionally the head 120 is provided with second bore 122 normal to the head to allow insertion of a screwdriver or other instrument to free the tool from the tube after use.

The use of the guide rod and insertion tool may be easily understood by those skilled in the art without reference to drawings of standard shell and tube heat exchangers. The headers of a shell and tube heat exchanger are first removed to expose the tube sheets and tubes at either end. The tube to be replaced is identified and the guid rod 200, assembled to the appropriate length, is inserted from one end.

If the tube to be removed is plugged or blocked, preventing passage of the rod, then the rod can simply be advanced as the block tube is removed. The tube is then removed from the opposite end leaving the guide rod 200 in place through the holes in the tube sheets and baffles. The handle 206 prevents the rod from being removed with the tube.

The appropriate tool 100 for the OD of the tube to be replaced is selected and extension 101 is fitted with the appropriate set of springs 102 or O-rings 107 for the tube ID. The extension 101 is inserted into the end of the replacement tube with the rear of the head 120 or nut 103 abutting the end of the tube. The tool 100 is then fitted over the end of the rod 200 and the tool and tube forced along the length of the guide rod 200. The small clearance between the bore 130 and the rod 200 prevents wobble and assures smooth insertion. The tapered bullet head 120 guides and centers the tube in the holes in the tube sheets and baffles. When the tube is in the desired position the rod 200 and tool 100 are removed. As noted, using the tool and method described a sixteen foot tube may be inserted in a matter of seconds, longer tubes taking somewhat longer.

What is claimed is:

1. A system for replacing a tube in a shell and tube heat exchanger having a multitude of tubes secured within the shell at either end by tube sheets and the tubes supported by baffles, comprising in combination:
   (a) a guide rod adapted to be inserted into a tube to be replaced, said rod being of sufficient length to extend from either end of said tube and said rod including retaining means at one end to prevent said rod from passing through said tube sheet when said tube is removed; and
   (b) an insertion tool having a tapered head and an extension extending from the rear of said head and adapted to fit into a replacement tube, said head being substantially the same width at its widest point as the outer diameter of said replacement tube, said tool having a central longitudinal bore adapted to closely fit over said guide rod.

2. The system of claim 1 wherein said guide rod comprises a plurality of segments joinable together to construct a rod of the desired length.

3. The system of claim 2 wherein said plurality of segments comprises at least one segment eight feet in length and at least one segment less than eight feet in length and wherein said retaining means is secured to said segment less than eight feet in length.

4. The system of claim 1 wherein said insertion tool includes securing means for securing said insertion tool in a replacement tube.

5. The system of claim 4 wherein said securing means further comprises centering means for centering said insertion tool in said replacement tube.

6. The system of claim 1 wherein a plurality of insertion tools is provided to fit standard heat exchanger outer diameters.

7. The system of claim 6 wherein each of said plurality of said insertion tools is provided with a plurality of securing means to adapt each of said plurality of insertion tools to the standard inner diameter of standard outer diameter heat exchager tubes.

8. The system of claim 1 wherein the clearance between said guide rod and the diameter of said bore is substantially 1/64 inch.

* * * * *